United States Patent [19]

Alfors

[11] Patent Number: 5,512,820
[45] Date of Patent: Apr. 30, 1996

[54] ROTATIONAL POSITION SENSOR WITH A TWO-PART ROTATABLE MEMBER TO RESIST JAMMING

[75] Inventor: Eugene D. Alfors, Rockford, Ill.

[73] Assignee: Honeywell Inc., Minneapolis, Minn.

[21] Appl. No.: 405,651

[22] Filed: Mar. 17, 1995

[51] Int. Cl.$^6$ ............................... G01B 7/14; G01B 7/30
[52] U.S. Cl. ................... 324/207.22; 324/207.2; 324/207.25
[58] Field of Search ................... 324/207.22, 207.21, 324/207.20, 207.25, 235, 251, 252, 262, 174, 207.11; 338/32 R, 32 H

[56] References Cited

U.S. PATENT DOCUMENTS 5,157,329  10/1992  Brauer .................................. 324/207.2
5,164,668  11/1992  Alfors .

*Primary Examiner*—Walter E. Snow
*Attorney, Agent, or Firm*—William D. Lanyi

[57] ABSTRACT

A rotational position sensor is provided with a rotatable member that comprises first and second portions. The first portion is generally cylindrical and has an opening that is shaped to receive the second portion therein with a resilient spring disposed in the annular gap between the first and second portions when this assembly is accomplished. A magnet is molded into or otherwise affixed to an extension of the first portion and the second portion of the rotatable member is shaped to receive a shaft. Relative rotation is permitted between the first and second portions of the rotatable member so that the shaft will not be ceased in position if the rotatable member is jammed within a stationary portion of the sensor. If jamming occurs, such as that which might be caused by icing, the first portion of the rotatable sensor might be ceased in position and restricted from further rotational movement. However, the second portion will remain free to rotate with the shaft because of the relative angular movement that is permitted between the first and second portions. This movement is in association with the changing torsion of the spring disposed in the gap between the first and second portions. When the ceasing of the first portion of the rotatable member is eliminated, the first and second portions of the rotatable member move back to their regular positions relative to each other and continued normal operation is possible.

20 Claims, 11 Drawing Sheets

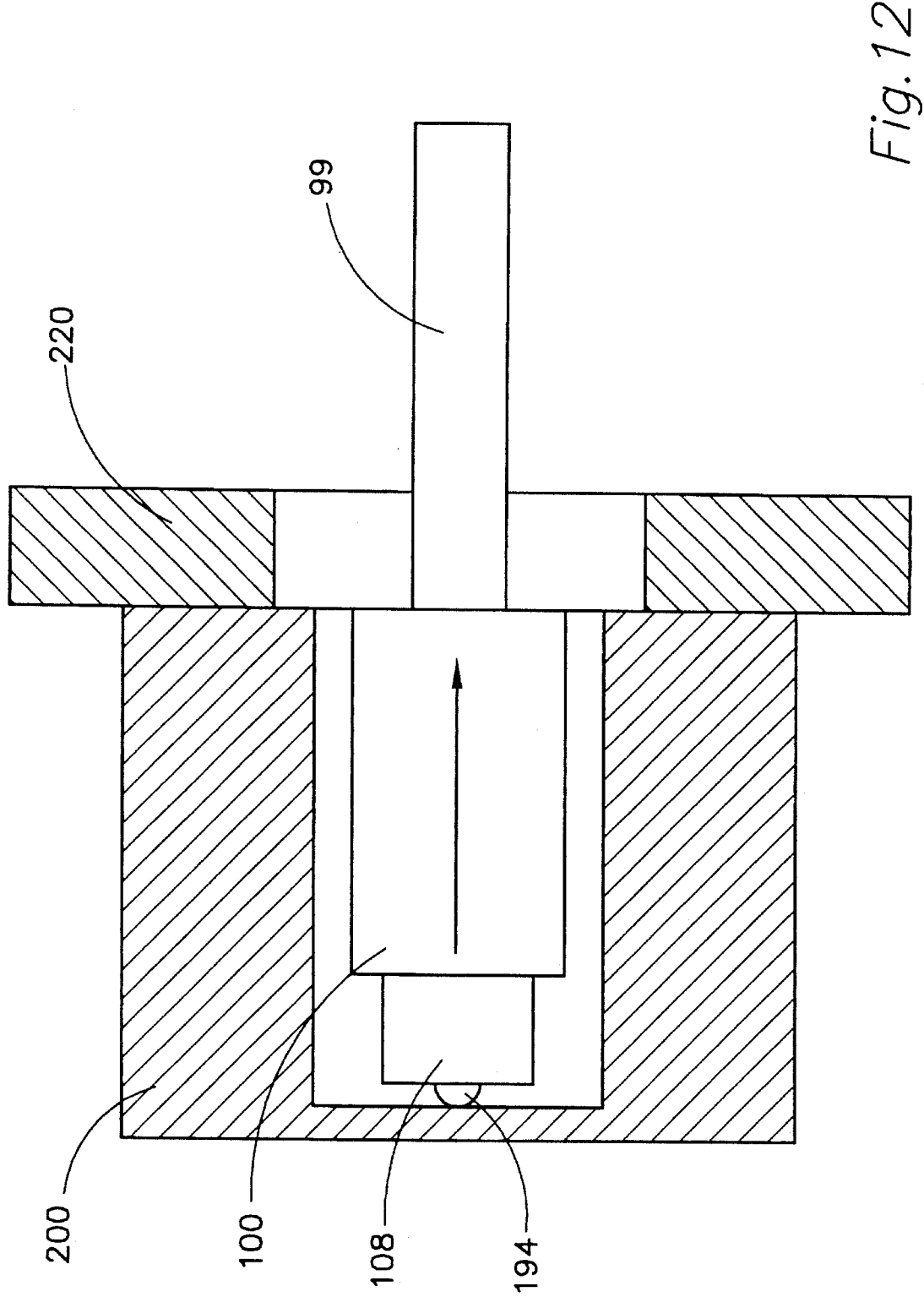

1

ROTATIONAL POSITION SENSOR WITH A TWO-PART ROTATABLE MEMBER TO RESIST JAMMING

BACKGROUND OF THE INVENTION

1. Field of the Invention

The present invention relates generally to a rotational position sensor and, more specifically, to a rotational position sensor for determining the angular position of a shaft in a way that avoids the possibility of restricting the motion of the shaft due to jamming of the sensor.

2. Description of the Prior Art

Various types of rotational position sensors are known to those skilled in the art. Certain angular position sensors incorporate a rotatable magnet that moves in coordination with a shaft whose angular position is to be measured. The rotating magnetic field of the magnet is sensed by a magnetically sensitive component, such as a Hall effect device or a magnetoresistive component. In many types of rotational position sensors, the magnet is attached to the shaft and rotates relative to a stationary portion of the sensor.

If the rotatable magnet becomes jammed and its rotatability is affected, the shaft whose angular position is being measured may be restricted from further movement. In certain situations, this restriction due to jamming of the sensor can be significantly deleterious. As an example, if the rotational position sensor is used to determine the angular position of a throttle plate shaft of an automobile's throttle body assembly, control of the engine's operation can be seriously affected and can possibly result in a dangerous situation. For example, if the driver of an automobile depresses the accelerator and causes the automobile's engine to increase its speed, the return of the engine to its idle speed when the driver removes the pressure from the accelerator peddle is critically important. Otherwise, the engine can continue to accelerate and an exceedingly dangerous condition can be created.

Jamming of the rotatable portion of a rotational position sensor within the stationary portion of the rotational position sensor can occur as a result of several conditions. One possible cause of this type of jamming is the formation of ice in the region between the rotatable and stationary portions of the angular position sensor. If ice forms within the region between the rotatable and stationary portions of the sensor, it is possible that the ice can retain the rotatable position sensor and its attached shaft in a position that will result in the dangerous condition described above. It would therefore be advantageous if a rotational position sensor could be provided which allows the shaft to return to its neutral position even if a rotatable portion of the rotational position sensor is jammed with respect to the stationary portion of the sensor.

As will be described in greater detail below, certain rotational position sensors have been developed which incorporate a lost motion component in the attachment between the shaft being monitored and the rotatable portion of the sensor. These types of lost motion attachments often require the use of an associated spring mechanism. However, the inclusion of a spring between the rotatable and stationary portions of the sensor in known rotational position sensors results in other problems that disadvantageously affect the operation of the angular position sensor.

U.S. Pat. No. 5,164,668, which issued to Alfors on Nov. 17, 1992, discloses an angular position sensor that has decreased sensitivity to shaft position variability. The angular position sensor is provided with first and second pole pieces that extend from regions proximate a rotatable magnet to regions proximate a magnetically sensitive device. The pole pieces provide defined magnetic paths of lower reluctance that confine the lines of flux extending between the rotatable magnet and the magnetically sensitive device. The placement of the rotatable magnet between first and second pole pieces segments of the invention significantly reduces the sensitivity of the sensor to variations in position of the rotatable magnet and therefore increases the reliability of the measurement system. This reduced sensitivity inhibits the degradation of operational accuracy that could otherwise be caused by inaccuracies in the magnet's shaft position, large tolerances in the dimensions of the shaft diameter and the bearing diameter and variable location of the shaft because of excessive bearing wear.

SUMMARY OF THE INVENTION

In a preferred embodiment of the present invention, the rotational position sensor comprises a stationary member which comprises a magnetically sensitive component and a rotatable member that comprises a first portion and a second portion. The second portion of the rotatable member is shaped to receive a rotatable shaft.

A magnet is attached to the first portion of the rotatable member and the magnetically sensitive component is disposed within the magnetic field of the magnet. The magnet is rotatable relative to the magnetically sensitive component in response to rotation of the rotatable member. A resilient member is connected to the first and second portions of the rotatable member to permit relative movement between the first and second portions of the rotatable member in response to a predetermined force urging that relative movement. In a particularly preferred embodiment of the present invention, the resilient member is a torsion spring. Also, in a preferred embodiment of the present invention, the first portion of the rotatable member is generally cylindrical in shape and the second portion of the rotatable member is disposed within the first portion. The torsion spring is disposed between the first generally cylindrical portion of the rotatable member and the second rotatable member in a particularly preferred embodiment of the present invention. However, alternative locations of the spring are within the scope of the present invention.

The rotatable member can be supportable by the rotatable shaft in noncontact relation with the stationary member. In one embodiment of the present invention, an abradable protrusion is attached to an outer surface of the rotatable member. Alternatively, an abradable protrusion can be attached to an inner surface of the stationary member. In either case, the abradable protrusion minimizes the frictional contact between the rotatable and stationary members in embodiments of the present invention which require at least a minimal contact between the rotatable and stationary portions of the sensor because of its particular structure or application.

BRIEF DESCRIPTION OF THE DRAWINGS

The present invention will be more fully and completely understood from a reading of the Description of the Preferred Embodiment in conjunction with the drawings, in which:

FIG. 12 shows an alternative embodiment of the present invention.

DESCRIPTION OF THE PREFERRED EMBODIMENT

Figure 1:
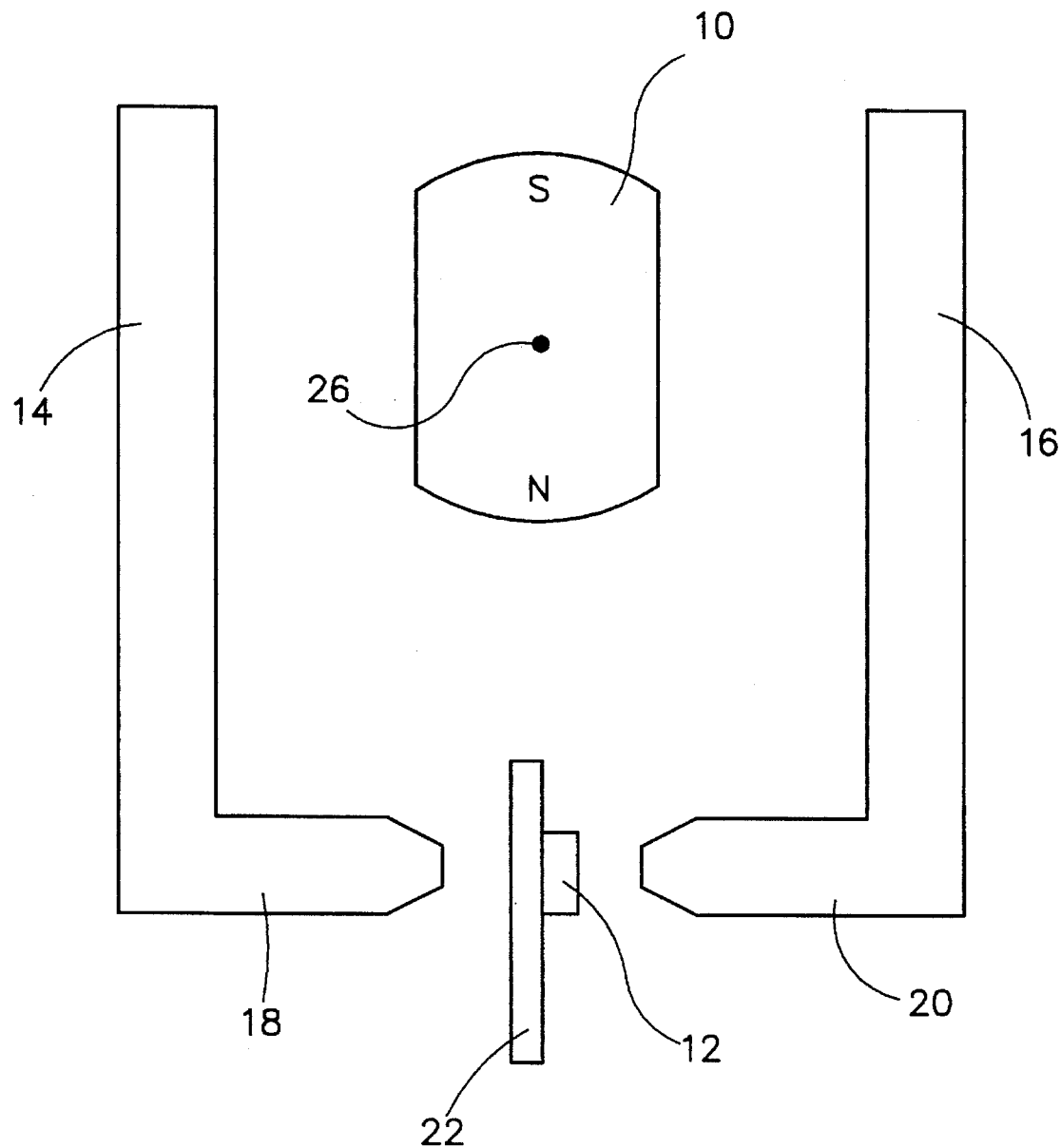
FIG. 1 illustrates a rotational position sensor known to those skilled in the art.

Throughout the Description of the Preferred Embodiment, like components will be identified by like reference numerals.

FIG. 1 illustrates an arrangement of a magnet 10 and a magnetically sensitive component 12 which is generally known to those skilled in the art. The illustration of FIG. 1 is similar to FIG. 9B of U.S. Pat. No. 5,164,668 which is explicitly incorporated by reference. The simplified schematic illustration of FIG. 1 will be used to illustrate a typical arrangement of a rotatable position sensor for purposes of describing the advantages of the present invention. However, it should be understood that the arrangement illustrated in FIG. 1 is not limiting to the present invention and many alternative configurations are possible for use in association with the concepts of the present invention.

In FIG. 1, two pole pieces, 14 and 16, are shown arranged on opposite sides of the magnet 10. Each of the pole pieces is provided with an extension member. For example, extension member 18 extends from the bottom portion of pole piece 14 and extension member 20 extends from the bottom portion of pole piece 16. Between the two extension members, 18 and 20, the magnetically sensitive component 12 is attached to a printed circuit board 22. As the magnet 10 rotates about its center of rotation 26, the proportion of the magnetic flux extending through each of the pole pieces changes in response to the rotational position of the magnet 10. This changing proportion can be monitored by the magnetically sensitive component 12 and, as a result, the rotational position of the magnet 10 can be determined. This concept is described in detail in U.S. Pat. No. 5,164,668 and will not be restated in this discussion.

Figure 2:
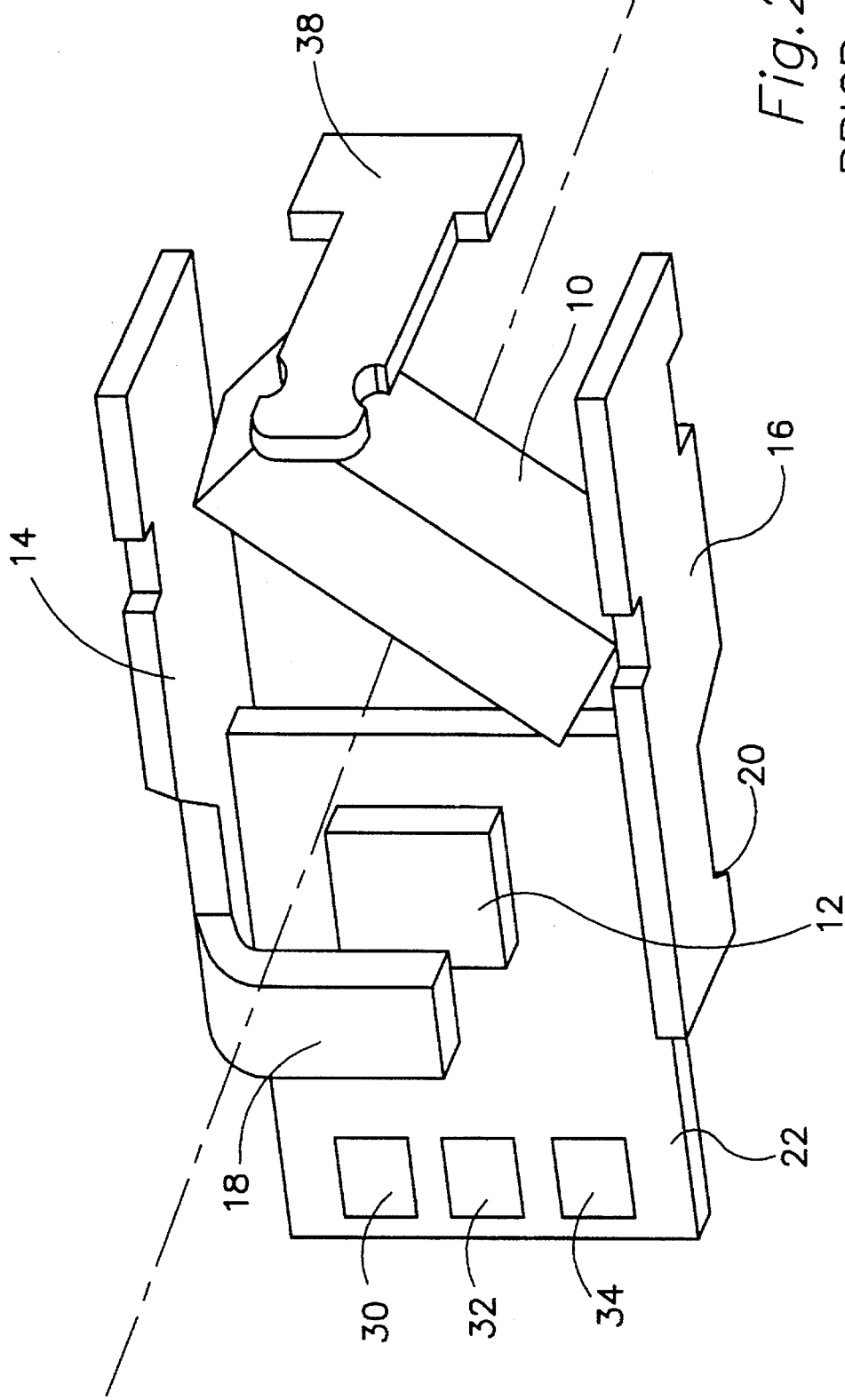
FIG. 2 is a perspective view of an arrangement of pole pieces, magnets and magnetically sensitive components that are generally known to those skilled in the art.

FIG. 2 is a perspective view of a modified version of the device illustrated in FIG. 1. The extension members, 18 and 20, are arranged in overlapping association with each other so that the magnetically sensitive component 12 can be disposed between the two extension members and aligned in a direction which is generally perpendicular to the direction of the magnetically sensitive component 12 illustrated in FIG. 1. This modification of the pole pieces is used to allow an advantageous packaging of the components within a particular rotational position sensor. The printed circuit board 22 is provided with three contact pads, 30, 32 and 34, which are used to permit the electrical connection between components associated on the printed circuit board 22 and external devices such as the control microprocessor of an automobile engine. Although extension member 20 is not fully visible in FIG. 2, it should be understood that it is bent relative to pole piece 16 to extend behind the printed circuit board 22 in a generally symmetrical manner relative to pole piece 14 and extension member 18. The device identified by reference numeral 38 in FIG. 2 is a spring retainer which is provided for the purpose of retaining one end of the torsion spring relative to the stationary housing.

Figure 3:
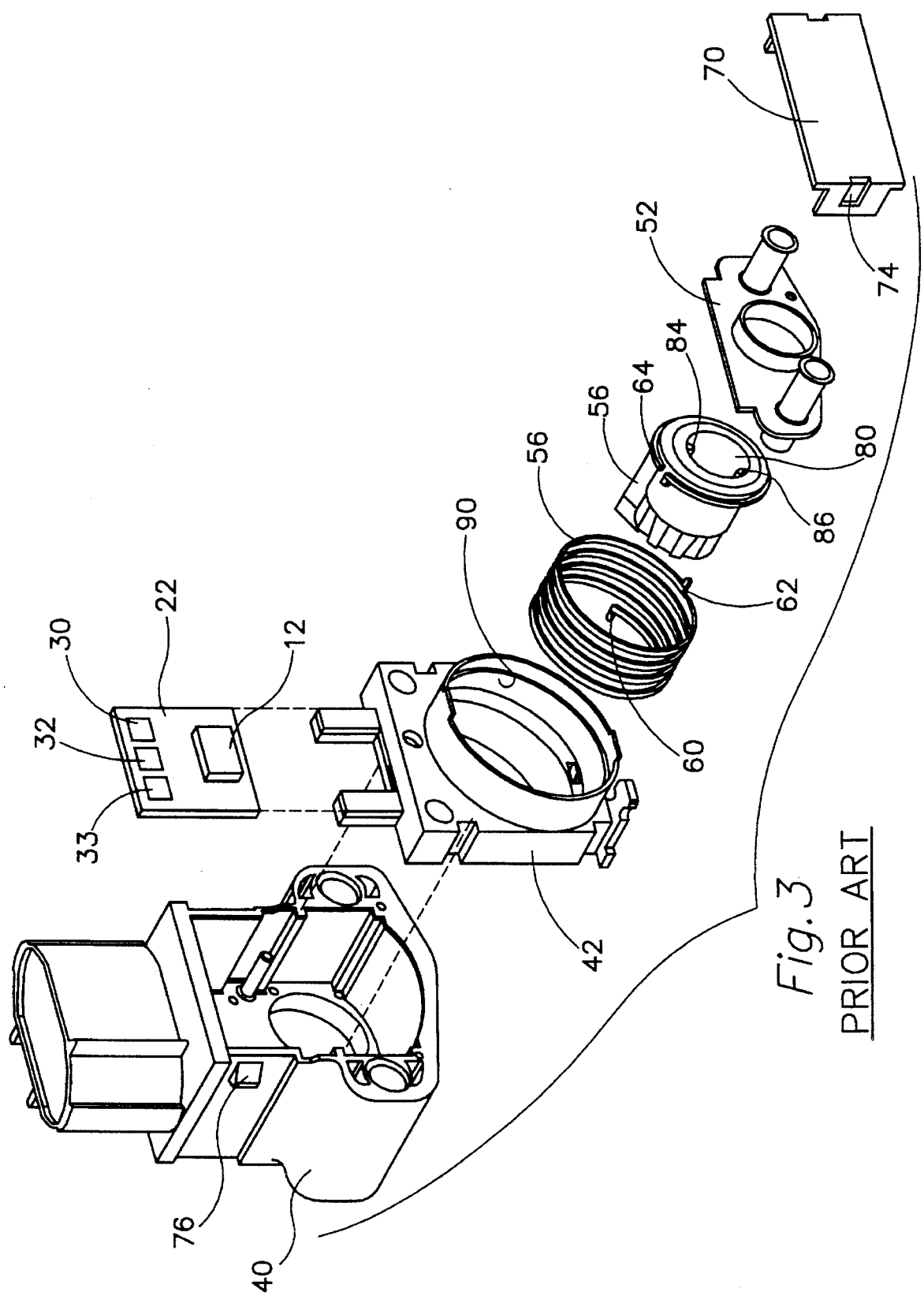
FIG. 3 shows an exploded perspective view of a rotational position sensor known to those skilled in the art.

FIG. 3 illustrates an exploded view of a known rotational position sensor that is particularly designed for use in association with a throttle plate shaft in a throttle body assembly of an automobile engine. A housing 40 is shaped to receive a stationary component 42. The stationary component 42 and the housing 40 are attached to each other and remain stationary during the operation of the sensor. The stationary component 42 is shaped to receive the printed circuit board 22 which has the magnetically sensitive component 12 attached to it as described above. When the printed circuit board 22 is installed within the stationary component 42, the magnetically sensitive component 12 is placed between the extension members, 18 and 20, which are illustrated in FIG. 2. The pole pieces described above in conjunction with FIGS. 1 and 2 are molded as integral portions of the stationary component 42. As such, they are not visible in FIG. 3.

With continued reference to FIG. 3, a rotatable member 48 is formed of a plastic material and completely encapsulates a magnet. The magnet is not visible in FIG. 3, but it should be understood that the magnet is encapsulated within the structure of the rotatable member 48 for disposition between portions of the pole pieces that are formed within the stationary component 42. A retainer 52 is shaped to attach to the housing 40 and retain the components within the cavity formed in the housing. Between the stationary component 42 and the rotatable member 48, a spring 56 is disposed for contact with both of its related elements. At one end of the spring, a first tab 60 is shaped to mate with a spring retainer 38 which is rigidly affixed to an opening within the stationary component 42. At the other end of the spring, a second tab 62 is shaped to be received in a portion 64 of the rotatable member 48. The function of the spring 56 is to cause the rotatable member 48 to return to a null position when a rotational force, exerted by a shaft whose angular position is to be measured, is removed. A cover 70 is shaped to be received on the housing 40 to enclose the upper portion of the cavity formed within the housing 40. As shown in FIG. 3, openings 74 are formed on the cover 70 for the purpose of cooperating with protrusions 76 and attaching the cover 70 to the housing.

With continued reference to FIG. 3, it should be seen that the end of the rotatable member 48 is provided with an opening 80. Within this opening 80, two protrusions, 84 and 86, are formed for purposes of being associated with a rotatable shaft in a lost motion relationship. This lost motion relationship will be described below in greater detail. However, it should be understood that the purpose of this lost motion relationship is to permit the throttle shaft being monitored to return to its null position in the event that the rotatable member 48 is seized in any way relative to the stationary component 42 or the housing 40. The spring 56, in turn, operates to keep the protrusions, 84 and 86, in continuous contact with the throttle shaft during normal operation.

Since the spring 56 is attached to both the stationary component 42 and the rotatable member 48, relative movement between the rotatable member 48 and the stationary component 42 will cause the torsion spring to be distorted. This distortion can result in certain problems in rotational position sensors known to those skilled in the art. The distortion of the spring 56 can cause it to move into contact with the inner cylindrical surface 90 of the stationary component 42. This contact, in combination with the relative movement of the spring 56 with respect to the surface 90, can cause rubbing to occur in this region. The rubbing, in turn, can abrade portions of the surface 90 and, in addition, can create a binding action that restricts the proper movement of the rotatable member 48. Since the rotational position sensor must be able to accurately determine the rotational position of the throttle shaft, any binding of this type will adversely affect the accuracy of the sensor. This results from the fact that the binding will cause the magnet within the rotatable member 48 to move independently from the position of the shaft.

Figure 4:
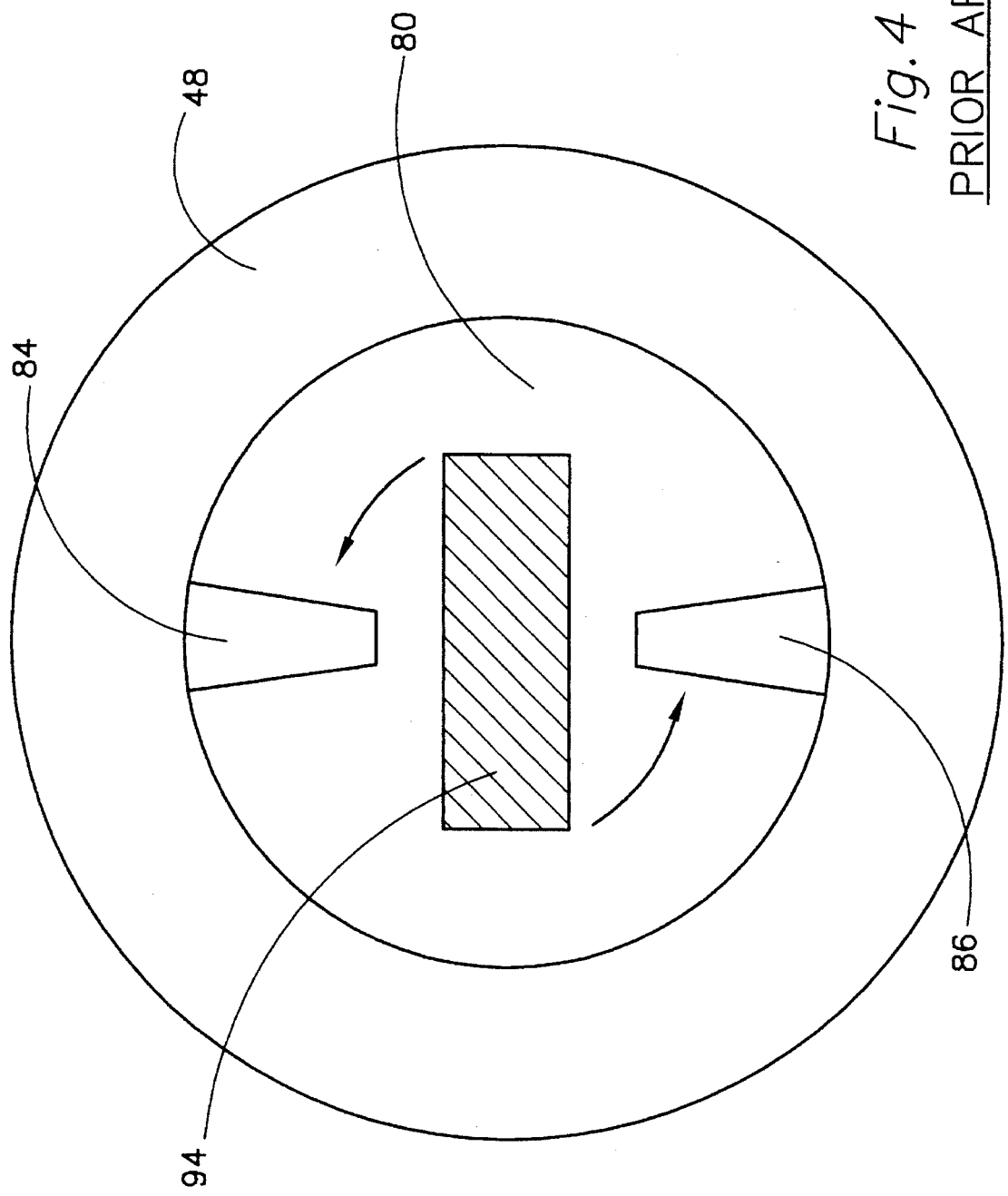
FIG. 4 is an end view of a rotatable member used in a rotational position sensor known to those skilled in the art.

FIG. 4 illustrates an end view of the rotatable member 48 described above in conjunction with FIG. 3. The opening 80 in the end face of the rotatable member 48 is illustrated with the two protrusions, 84 and 86, extending toward the center of the rotatable member 48. A tongue portion 94 of a throttle shaft is illustrated in cross sectional view. The tongue 94 is not rigidly attached to the rotatable member 48 in this particular type of rotational position sensor which is known to those skilled in the art. Instead, rotation of the tongue 94 in the direction represented by the arrows in FIG. 4 causes it to move into contact with the protrusions, 84 and 86. When this contact is achieved, continued rotation of the throttle shaft will cause the rotatable member 48 to move in a counterclockwise direction. When the rotational position sensor is assembled, the torsion on the spring 56 and the relative positions of the components are arranged so that the spring will maintain contact between the protrusions of the rotatable member 48 and the tongue 94 even when the tongue moves back towards its null position in a clockwise direction. The provision of this lost motion mechanism in known sensors is for the purpose of avoiding the adverse affect on the throttle if the rotatable member 48 is jammed relative the stationary components of the sensor.

Figure 5:
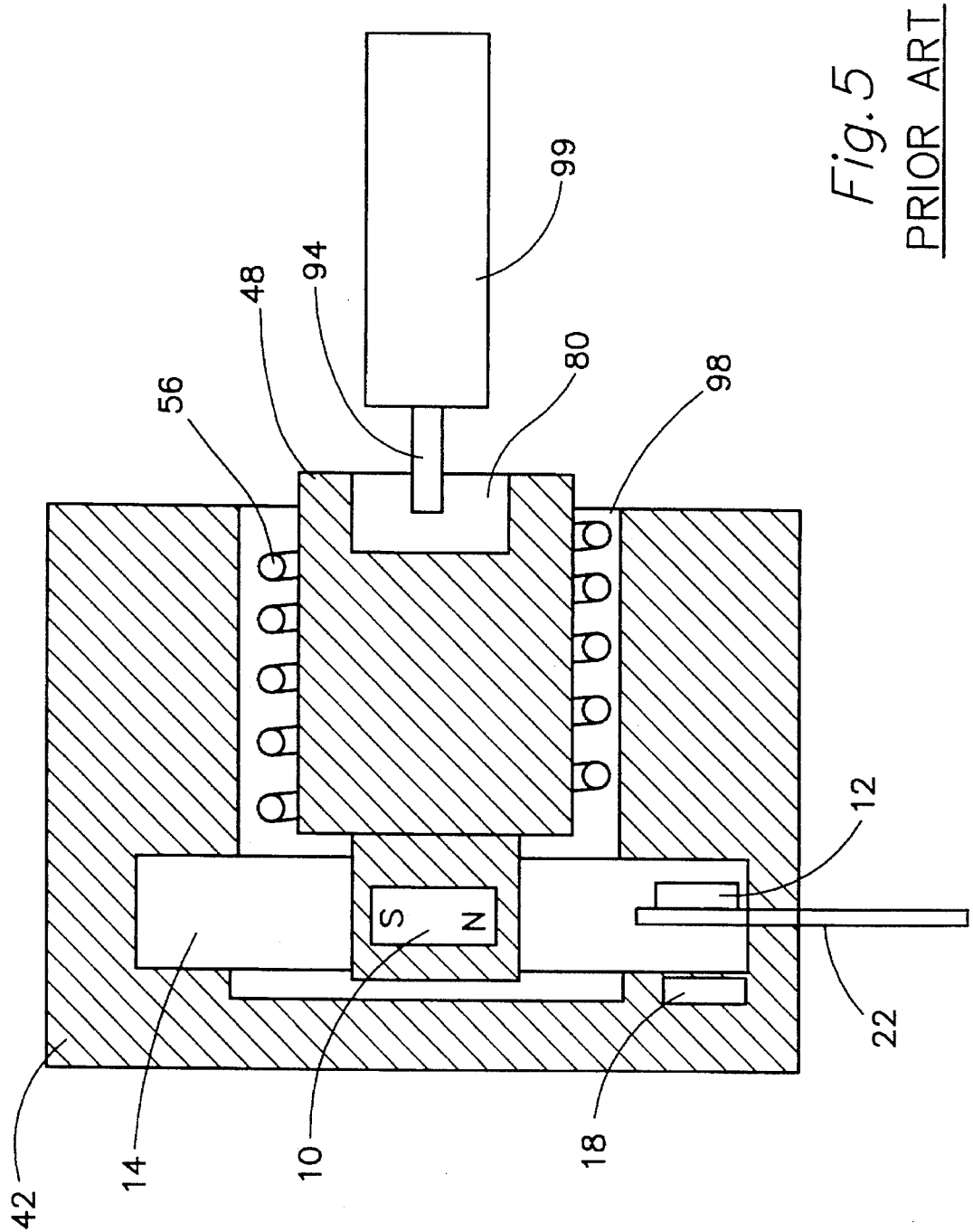
FIG. 5 is a sectional schematic view of a rotational positional sensor known to those skilled in the art.

FIG. 5 is a schematic representation of the rotational position sensor described above in conjunction with FIG. 3. As can be seen in FIG. 5, the spring 56 is disposed within the relatively confined space 98 between the outer surface of the rotatable member 48 and the inner surface of the stationary component 42. Although FIG. 5 is schematic and simplified for purposes of this discussion, it can be seen that the rotation of the rotatable member 48 relative to the stationary component 42 will cause distortion of the spring 56 because of its mutual attachment to both of these components. This relative rotation of the rotatable member 48 and the stationary component 42 can cause the spring 56 to move into contact with the inner surface of the stationary component 42 that is identified by reference numeral 90 in FIG. 3. The spring 56 essentially maintains a contact between the stationary and rotatable components of the device illustrated in FIG. 5. Ideally, the rotatable member 48 would operate more efficiently if it was free of all contact with the stationary components.

Figure 6:
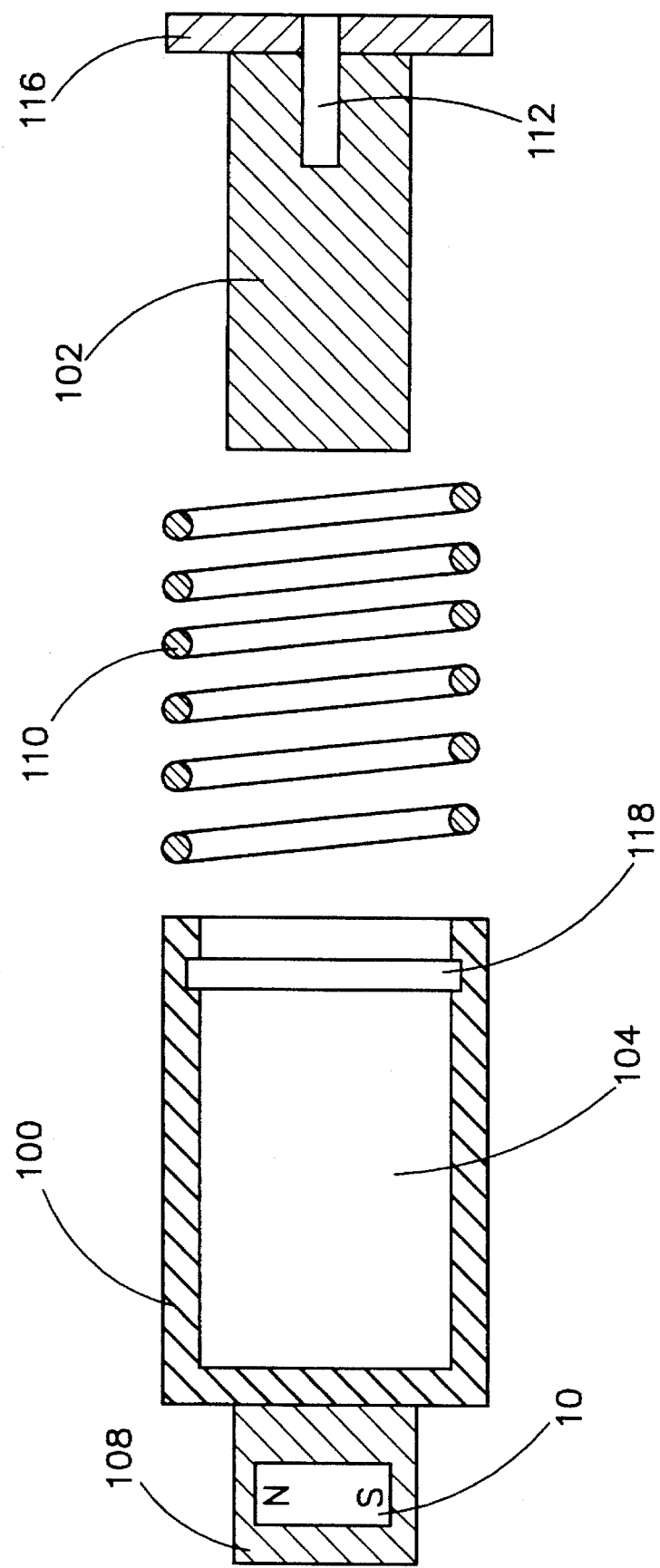
FIG. 6 is an exploded sectional view of a rotatable member made in accordance with the present invention.

FIG. 6 illustrates a rotatable member of a rotational position sensor that is made in accordance with the concepts of the present invention. The rotatable member illustrated in FIG. 6 comprises a first portion 100 and a second portion 102. The first portion 100 is generally cylindrical in shape and has an opening 104 that is shaped to receive the second portion 102 within it. An extension 108 is attached to the first portion 100 and the magnet 10 is encapsulated within the extension. The opening 104 of the first portion 100 is sized to receive the second portion 102 within it in such as way that a space around the second portion 102 permits a resilient member, such as spring 110 to be enclosed within that space. Although not illustrated in FIG. 6, it should be understood that the spring 110 is provided with tabs at its respective ends to attach it to both the first portion 100 and the second portion 102.

With continued reference to FIG. 6, the second portion 102 is provided with an opening 112 that is shaped to receive a tongue of a shaft whose rotational position is to be monitored. The second portion 102 is also provided with an end portion 116 that will be described in greater detail below. The function of The end portion 116 is to fit within an annular slot 118 so that the first and second portions of the rotatable member can be locked together to prevent relative axial movement between the first and second portions while permitting relative angular motion between these portions.

Figure 7:
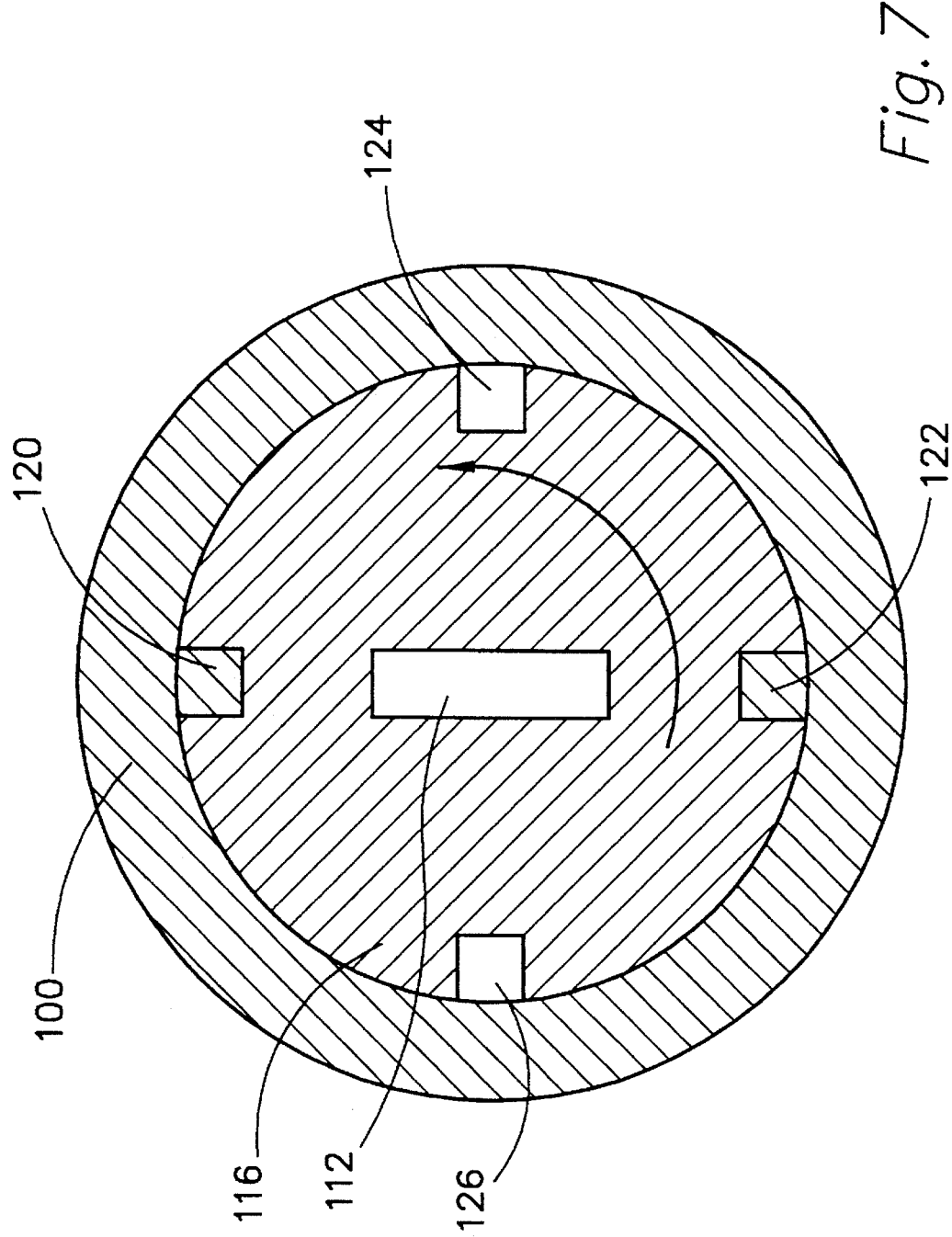
FIG. 7 is an end view of a rotatable member made in accordance with the present invention.

FIG. 7 shows an end view of the rotatable member of the present invention that is described above in conjunction with FIG. 6. The slot 118 formed in the first portion 100, as illustrated in FIG. 6, is formed by the advantageous positioning of protrusions 120 and 122 which extend radially inwardly from the first portion 100. These protrusions cooperate with notches 124 and 126 that are formed in the end portion 116 of the second portion 102 of the rotatable member. By aligning the tabs, 120 and 122, with the notchers, 124 and 126, the second portion 102 can be moved axially into the opening 104 of the first portion 100. After this axial movement is accomplished, the second portion 102 can be rotated to lock it within the opening of the first portion. As can easily be understood by one skilled in the art, this assembly process is best accomplished with the spring 110 slightly rotated in order to maintain a desired amount of torsional strain after the first and second portions are locked together to prevent axial movement therebetween. It should also be understood that the operation of the tabs, 120 and 122, in cooperation with the end portion 116 prevent this relative axial movement while permitting relative angular movement between the first and second portions of the rotatable member. It is important to realize that under normal operation of a rotational position sensor made in accordance with the present invention, the tension on the torsional spring 110 will never change. This results because the first and second portions, 100 and 102, are not intended to move relative to each other in the angular direction. The only time that the torsion on the spring 110 will change is if the first portion 100 becomes jammed and rigidly attached to the stationary components of the sensor at a time when the shaft and tongue attempts to return to its null position or, in fact, any position other than the one in which the first portion 100 is jammed. The resiliency of the spring 110 will permit this relative movement between the first and second portions of the rotatable member and will therefore allow the throttle plate to return to its null position. In one particular example, this action of the spring 110 will permit the throttle plate to return to a neutral position in response to the release of force on the accelerator pedal by the driver of an automobile. As a result, the engine will not race and an otherwise dangerous condition will be avoided. In addition, this result is accomplished without the need for a spring to be applied in the manner illustrated in FIG. 3. This eliminates the undesirable wear on the components and also eliminates the possibility that contact between the spring and the stationary components will adversely affect the accuracy of the sensor. In a particularly preferred application of the present invention, there is no contact between the rotatable member and the stationary components of the sensor.

Figure 8:
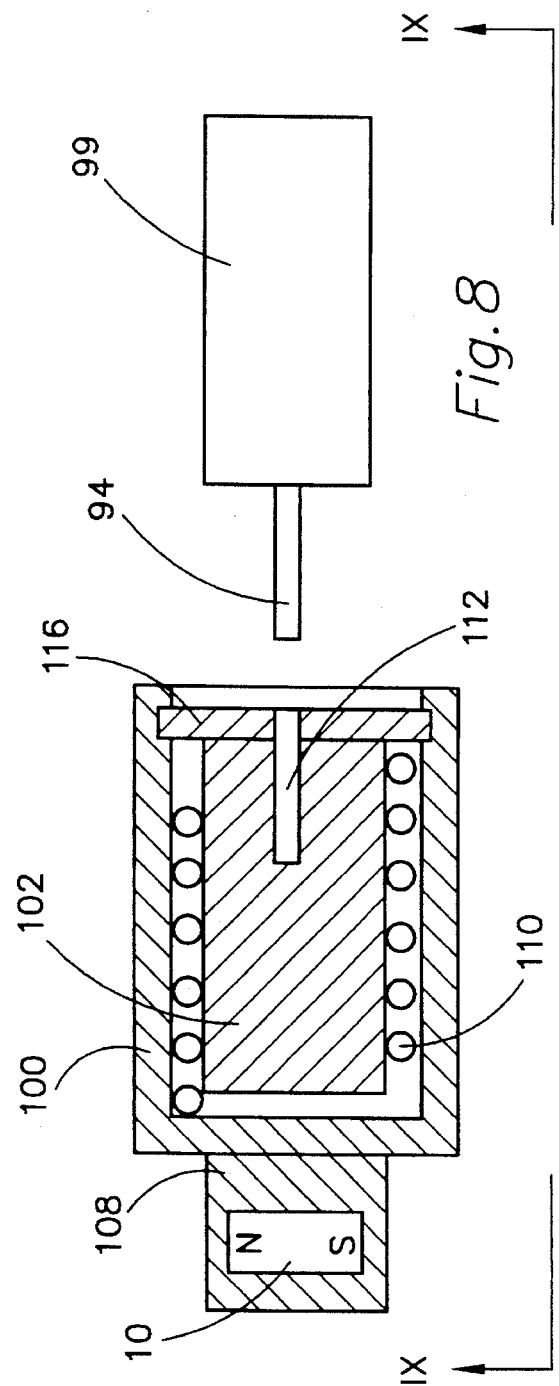
FIGS. 8 and 9 show assembled views of a rotatable member made in accordance with the present invention.

FIG. 8 shows the second portion 102 disposed within the opening of the first portion 100 and the spring 110 located in the annular space between the first and second portions. The tongue 94 of a shaft 99 can be inserted into the opening 112 that is formed in the second portion 102 of the rotatable member. It is important to note that the opening 112 can be shaped to receive the tongue 94 in interference relationship therein. The need for a lost motion arrangement is eliminated when the present invention is used. Once attached to the shaft 96, the rotatable member illustrated in FIG. 8 rotates as a unitary body in coordination with the rotation of the shaft 99. No relative movement between the rotatable member and the shaft is expected unless a jamming condition occurs. In the event that the rotatable member is jammed with respect to a stationary portion of the rotational position sensor, the second portion 102 of the rotatable member continues to rotate with the shaft 99 even though the first portion 100 is jammed and unable to rotate. In this event, the spring 110 is deformed and permits this relative rotation to occur. As a result, the jamming of the first portion 100 does not adversely affect the ability of the shaft 99 to return to its null position.

Figure 9:
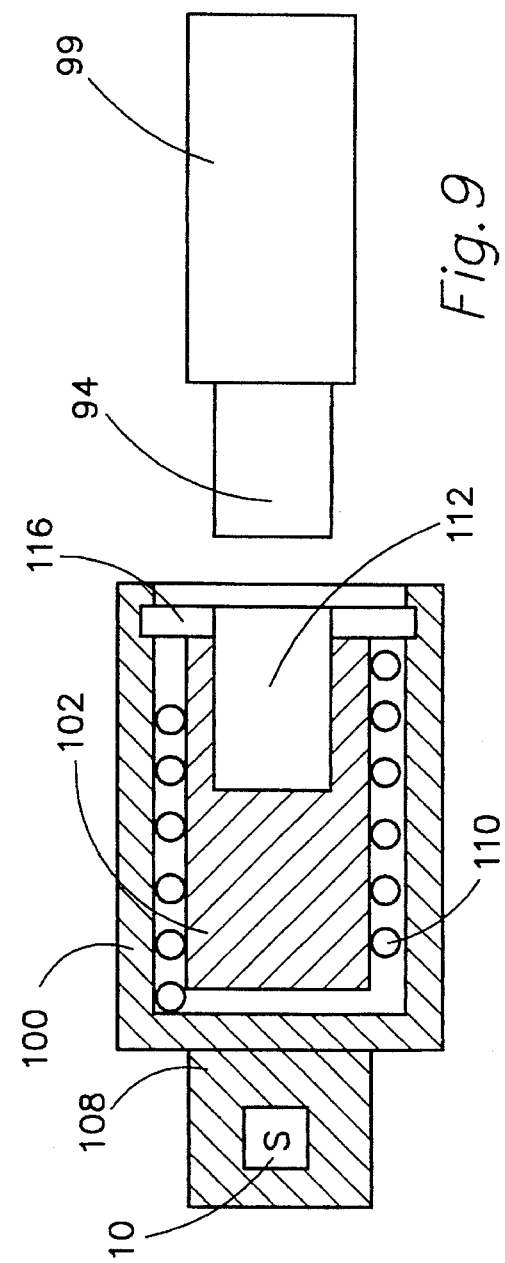

FIG. 9 is a side view of the arrangement shown in FIG. 8. The purpose of FIG. 9 is to provide an additional view of the relative positions of the magnet 10 with respect to the extension 108 and the relative shapes of the tongue 94 and the opening 112.

Figure 10:
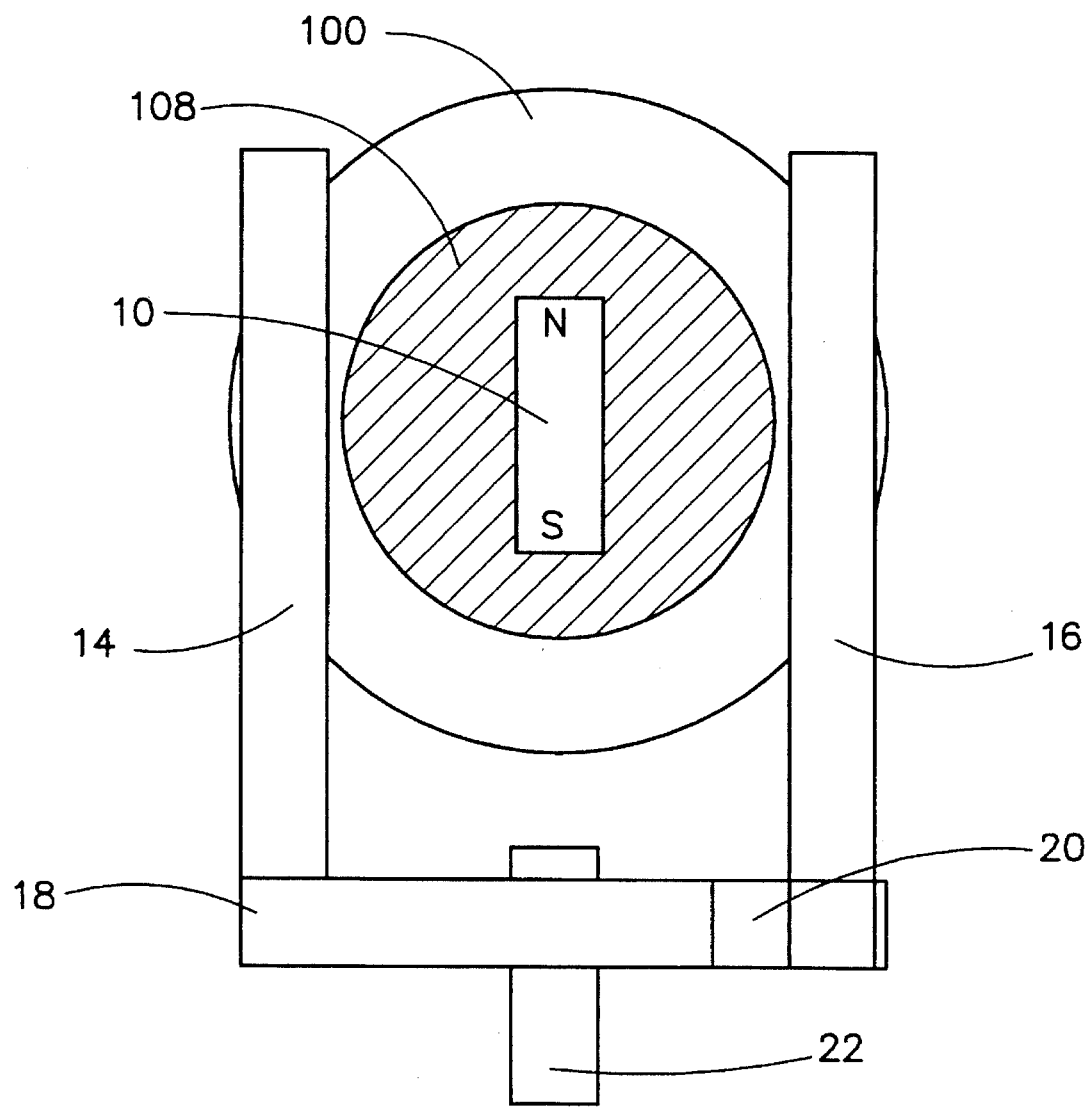
FIG. 10 is a schematic representation of a rotatable member associated with first and second pole pieces of a rotational position sensor.

FIG. 10 is a schematic representation of the first portion 100 and its extension member 108 in which the magnet 10 is encapsulated. The pole pieces, 14 and 16, are illustrated in non-contact association with the rotatable components illustrated in FIG. 10. The extension members, 18 and 20, are also shown for purposes of illustrating the relative positions of the components.

Figure 11:
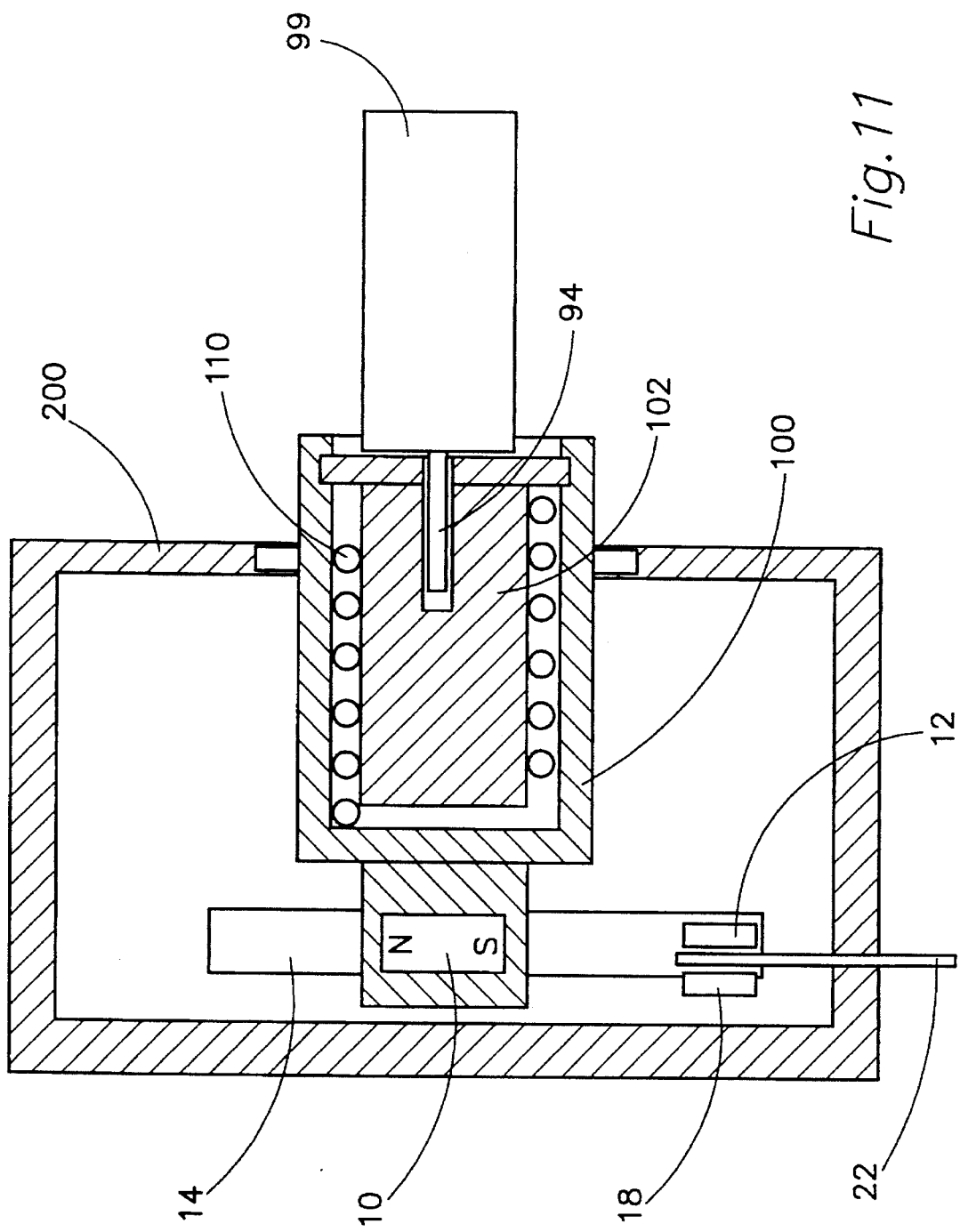
FIG. 11 illustrates a rotatable member made in accordance with the present invention associated with various stationary components of a rotational position sensor.

FIG. 11 is a schematic representation of the rotatable member of the present invention associated with a stationary housing structure 200. The rotatable member is shown extending through an opening in the wall of the stationary structure 200. As described above, the rotatable member is rigidly attached to the shaft 99 by the insertion of the tongue 94 into the opening in the second portion 102 of the rotatable member. This places the rotatable member in rigid attachment to the shaft 99 and in non-contact association with the stationary components. If, because of icing within the stationary components, the first portion 100 of the rotatable member becomes seized within the stationary component, the second portion 102 is free to rotate with the shaft 99 because of the resiliency provided by the spring 110. It should be clearly understood that rotation between the first and second portions of the rotatable member will not occur during normal operation. The relative rotation between the first and second portions of the rotatable member will only occur if the first portion is jammed while the shaft 99 attempts to rotate. Under these rare adverse conditions, the torsion on the spring 110 will change and relative rotation will be permitted between the first and second portions.

FIG. 12 illustrates one particularly preferred embodiment of the present invention. In FIG. 12, the stationary component 200 is shown attached to another structure 220 for the purpose of affixing the rotational position sensor relative to the shaft 99. During assembly of the rotational position sensor to the shaft 99, it may become necessary to exert a force, in the direction of the arrow in FIG. 12, between the housing 200 and the shaft 99. This force may be necessary to cause the tongue 94 to be inserted into the opening 110 as described above in conjunction with the other figures. This external force in the direction of the arrow will most likely be caused by pushing the housing 200 toward the external structure 220. This will move the tongue 94 into the opening 112. However, this exertion of force in the direction of the arrow in FIG. 12 may also cause the first portion 100 to move against internal portions of the stationary structure 200. As an example, the extension 108 could move into contact with the wall at the end of the opening within the stationary sensor housing. This could cause adverse contact between these elements. In order to avoid the deleterious results that might otherwise occur during this installation procedure, a protrusion 194 is provided on an external surface of the rotatable member. The protrusion 194 can be made to be abradable so that any remaining contact between the protrusion 194 and an internal surface of the stationary housing 200 will be reduced during the first initial operations of the sensor. In addition, the abradable protrusion 194 is disposed proximate the center of rotation of the rotatable member so that the effective moment on the rotatable member exerted by any frictional forces between the protrusion 194 and stationary surfaces within the sensor will be minimized.

Although the present invention has been described with particular specificity and illustrated to explicitly describe one preferred embodiment of the present invention, it should be understood that alternative embodiments are within its scope. The primary concept of the present invention is that it permits relative rotational movement between first and second portions of the rotatable member of a sensor in order to prevent the disadvantageous results that could otherwise occur if the rotatable member is jammed or ceased in position relative to stationary components of the sensor. The particular embodiments described above should be understood to be optional and not required in every embodiment of the present invention.

The embodiments of the invention in which an exclusive property or right is claimed are defined as follows:

1. A rotational position sensor, comprising:

a stationary member comprising a magnetically sensitive component;

a rotatable member comprising a first portion and a second portion, said first and second portions being rotatable relative to each other, said second portion being shaped to be attachable to a rotatable shaft;

a magnet attached to said first portion, said magnetically sensitive component being disposed within the magnetic field of said magnet, said magnet being rotatable relative to said magnetically sensitive component in response to rotation of said rotatable member; and a resilient member connected to said first and second portions to resist relative rotational movement between said first and second portions and to permit said relative rotational movement between said first and second portions only in response to a force which exceeds a predetermined magnitude urging said relative movement.

2. The sensor of claim 1, wherein:
   said resilient member is a torsion spring.

3. The sensor of claim 2, wherein:

said first portion is generally cylindrical in shape.

4. The sensor of claim 3, wherein:

said second portion is disposed within said first portion.

5. The sensor of claim 4, wherein:

said torsion spring is disposed between said first generally cylindrical portion and said second portion.

6. The sensor of claim 5, wherein:

said magnetically sensitive component is a Hall effect element.

7. The sensor of claim 1, wherein:

said rotatable member is supportable by said rotatable shaft in noncontact relation with said stationary member.

8. The sensor of claim 1, further comprising:

an abradable protrusion attached to an outer surface of said rotatable member.

9. The sensor of claim 1, further comprising:

an abradable protrusion attached to an inner surface of said stationary member.

10. A rotational position sensor, comprising:

a stationary member comprising a magnetically sensitive component;

a rotatable member comprising a first portion and a second portion, said first and second portions being rotatable relative to each other, said second portion being shaped to be attachable to a rotatable shaft;

a magnet attached to said first portion, said magnetically sensitive component being disposed within the magnetic field of said magnet, said magnet being rotatable relative to said magnetically sensitive component in response to rotation of said rotatable member; and a resilient member connected to said first and second portions resist relative rotational movement between said first and second portions and to permit said relative rotational movement between said first and second portions in response to a predetermined force urging said relative movement, said resilient member being a torsion spring.

11. The sensor of claim 10, wherein:

said first portion is generally cylindrical in shape; and said second portion is disposed within said first portion.

12. The sensor of claim 11, wherein:

said torsion spring is disposed between said first generally cylindrical portion and said second portion.

13. The sensor of claim 11, wherein:

said magnetically sensitive component is a Hall effect element.

14. The sensor of claim 11, wherein:

said rotatable member is supportable by said rotatable shaft in noncontact relation with said stationary member.

15. The sensor of claim 11, further comprising:

an abradable protrusion attached to an outer surface of said rotatable member.

16. The sensor of claim 11, further comprising:

an abradable protrusion attached to an inner surface of said stationary member.

17. A rotational position sensor, comprising:

a stationary member comprising a magnetically sensitive component;

a rotatable member comprising a first portion and a second portion, said first and second portions being rotatable relative to each other, said second portion being shaped to receive a rotatable shaft;

a magnet attached to said first portion, said magnetically sensitive component being disposed within the magnetic field of said magnet, said magnet being rotatable relative to said magnetically sensitive component in response to rotation of said rotatable member; and a resilient member connected between said first and second portions to permit relative movement between said first and second portions only in response to a predetermined magnitude of force urging said relative movement, said rotatable member being supportable by said rotatable shaft in noncontact relation with said stationary member.

18. The sensor of claim 17, wherein:

said magnetically sensitive component is a Hall effect element.

19. The sensor of claim 17, further comprising:

an abradable protrusion attached to an outer surface of said rotatable member.

20. The sensor of claim 17, further comprising:

an abradable protrusion attached to an inner surface of said stationary member.

* * * * *